United States Patent [19]

Hartwig et al.

[11] Patent Number: 4,492,526

[45] Date of Patent: Jan. 8, 1985

[54] COMPRESSOR DRIVE SYSTEM

[75] Inventors: Carl S. M. Hartwig, Täby, Sweden; Ludovicus J. van Nederkassel, Buggenhout, Belgium

[73] Assignee: Institut Cerac S.A., Ecublens, Switzerland

[21] Appl. No.: 444,827

[22] Filed: Nov. 26, 1982

[30] Foreign Application Priority Data

Dec. 18, 1981 [CH] Switzerland .................. 8098/81

[51] Int. Cl.$^3$ .................................................. F04B 49/06
[52] U.S. Cl. .................................................. 417/45
[58] Field of Search ................. 417/26, 28, 44, 45, 417/12; 318/685, 801; 307/118; 62/226; 363/132

[56] References Cited

U.S. PATENT DOCUMENTS

| | | | |
|---|---|---|---|
| 2,629,537 | 2/1953 | Graybrook et al. | 417/45 X |
| 2,687,841 | 8/1954 | Churchman | 417/28 |
| 3,499,297 | 3/1970 | Ruff et al. | 62/226 X |
| 3,860,858 | 1/1975 | Nola | 318/801 |
| 4,145,161 | 3/1979 | Skinner | 417/45 X |
| 4,149,827 | 4/1979 | Hofman | 417/12 |
| 4,220,440 | 9/1980 | Taylor et al. | 417/45 X |
| 4,259,620 | 3/1981 | Oates et al. | 363/132 X |
| 4,330,817 | 5/1982 | Avar et al. | 318/801 X |

Primary Examiner—Edward K. Look
Attorney, Agent, or Firm—Eric Y. Munson

[57] ABSTRACT

A compressor drive system for controlling the gas pressure in a pressure gas volume (106) connected to the compressor (101). A brushless alternating current motor (23) is directly coupled to the compressor, which is driven with the same speed as the motor. The pressure in the gas volume (106) is sensed by pressure sensing means (109) connected to a converter (114). The converter simultaneously changes the amplitude and frequency of the drive voltage supplied to the motor (23). This is done in response to pressure changes in volume (106). The motor is stopped if the pressure exceeds a preset maximum value. A pressure gas container (104) is depressurized at motor stop to allow restarting without counter pressure on the compressor. Means (44) for controlling the amplitude and frequency of the drive voltage is provided so that the normal speed maximum load current is never exceeded during motor start.

3 Claims, 5 Drawing Figures

COMPRESSOR DRIVE SYSTEM

The present invention relates to a compressor drive system for controlling the gas pressure in a pressure gas volume connected to the compressor in which the compressor is driven by a brushless alternating current motor, in the following also called ac-motor.

In prior art drive systems including ac-motors the motor is supplied with constant voltage at 50 Hz (or 60 Hz). The operating speed of a two-pole motor will then be 3000 rpm (3600 rpm at 60 Hz) in case of a synchronous motor and somewhat less for an asynchronous motor. The speed of a four-pole motor is half the speed of a two-pole motor. Because of these limitations, it is in most cases necessary to use a gear box or other device for changing the speed in order to drive the compressor at optimum speed.

Another drawback with the prior art, particularly regarding control of the gas pressure delivered to the consumers, is that the current during motor start becomes several times higher than the current at normal speed and full load. Therefore, the number of motor starts must be restricted in order to avoid overheating of the motor.

When the pressure of the gas delivered to the consumers is to be kept within prescribed limits independent of variations in the demand for pressure gas, the prior art offers only the possibility of cutting off the delivery of pressure gas since the capacity of the compressor is practically constant. This is done in basically two ways. First, the ac-motor is started and stopped to cope with the varying demand. The possibilities with this method are very limited, unless a very big container is used between the compressor and the consumer for storing pressure gas, because of the above mentioned risks for overheating of the motor. Second, the compressor is unloaded when the pressure reaches an upper limit value. This means that the motor continues to run while the delivery of pressure gas is prevented, throttling the air intake in rotary compressors or keeping the inlet valves open in piston compressors. This second prior art method is disadvantageous because a substantial amount of energy is required for driving the motor and the compressor while no productive work is done. In practice, modern compressor plants use a combination of the above mentioned two prior art methods, whereby the motor is started and stopped in a controlled way so that too frequent motor starts are avoided. Any additional control needed is provided by the unloading.

One object of the present invention is to provide a compressor direct drive system including a brushless alternating current motor in which the pressure in a gas volume connected to the compressor is controlled by controlling the speed of the ac-motor.

A further object of the invention is to provide means for sensing a preset maximum value of the delivered gas pressure and for decreasing the amplitude and frequency of the voltage supplied to the ac-motor to zero, when the preset maximum pressure is exceeded, in order to stop the motor.

A still further object of the invention is to provide a container with relief valve on the downstream side of the compressor in order to depressurize the container when the motor is stopped. This makes it possible to restart the motor without any back pressure on the compressor.

A still further object of the invention is to provide means for controlling the motor current so that the normal speed maximum load current never is exceeded during motor starts, thus allowing frequent motor starts without overheating of the motor.

With the present invention, which is defined by the appended claims, several advantages are obtained.

The compressor can be driven directly by the ac-motor at optimum speed without the use of a gearbox or other device normally required to change the motor speed into the optimum compressor speed. Since such devices are costly, introduce power losses, are subject to wear and may generate noise, it is possible to make a compressor plant cheaper, save energy and improve the reliability of the system by the present invention.

The possibility to operate the ac-motor at higher speeds than those obtainable at network frequency makes it possible to reduce the motor size for a given power. The reason is that the size of ac-motors is proportional to the driving torque, which is inversely proportional to the motor speed at a given output power.

Since a frequency converter can supply a voltage of virtually any frequency it is possible to choose the number of poles of the ac-motor in order to decrease the costs for the motor. It is known that a four-pole motor has a better relation between active and inactive material than a two-pole motor. The four-pole motor is, therefore, cheaper for a given rated torque.

Since the amplitude and frequency of the output voltage of the frequency converter can be increased from zero to full speed values in a controlled way the motor can be accelerated with a current which is not greater than the normal speed full load current.

Because of the gradual build-up of driving torque and speed a very smooth motor start is obtained without the mechanical shock loads which occur when an ac-motor is started at network frequency.

Because of the absence of motor start inrush current and because of the very smooth motor start the number of motor starts per hour is practically unlimited.

In most compressor installations there is a compressed medium receiver to smoothen out compressed medium demand variations. Since according to the present invention the capacity of the compressor is controlled within a wide range by speed control and because of the unlimited number of motor starts, it is possible to reduce or even eliminate the compressed medium receiver.

When the compressor capacity is reduced the energy consumption is reduced proportionally. The efficiency of the compressor is, therefore, substantially improved over prior art at part load.

Since the compressor capacity is regulated by speed control normal capacity regulating devices, such as inlet throttles on rotary compressors or inlet valve lifters on piston compressors, may be omitted.

An embodiment of the invention is described below with reference to the accompanying drawings in which.

Figure 1:
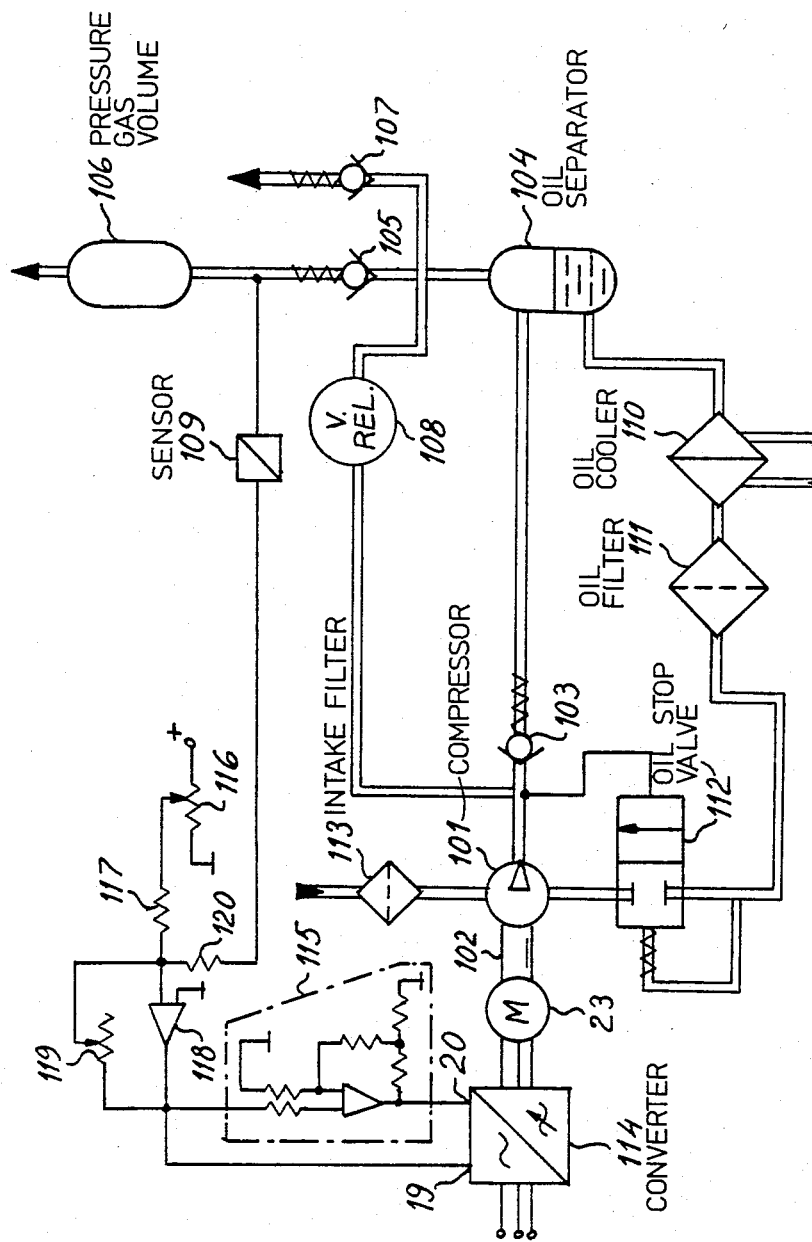
FIG. 1 shows a compressor plant with drive system according to the invention.

The compressor plant shown in FIG. 1 comprises a compressor 101 which by means of a shaft 102 is directly coupled to a brushless alternating current motor 23, whereby the compressor is driven with the same speed as the motor. The compressor shown in the drawing is of the oil-injected type, preferably a screw compressor, but could be of any type, e.g. a piston compressor. In the case of a screw compressor shaft 102 is, or is coupled to, the shaft of one of the screws. In the case of a piston compressor the shaft is the crank shaft. Gas to be compressed enters compressor 101 via intake filter 113. The compressed gas delivered by compressor 101 is conducted via check valve 103 to oil separator 104 where the oil is separated from the gas and collected on the bottom. The oil is then returned via oil cooler 110, oil filter 111 and oil stop valve 112 to the injection gallery of compressor 101. From the small pressure gas container 104 the compressed gas is conducted via check valve 105 to a pressure gas volume 106, which normally is the conduit system leading to the consumers. The plant is further provided with a safety valve 107 and a relief valve 108. The relief valve is controlled by the pressure at the outlet of compressor 101 such that it takes the position shown in the drawing when that pressure falls below a certain level upon stopping of motor 23. Container 104 is then depressurized so that a subsequent motor start can be performed without any counter pressure at the outlet of compressor 101.

Figure 2:
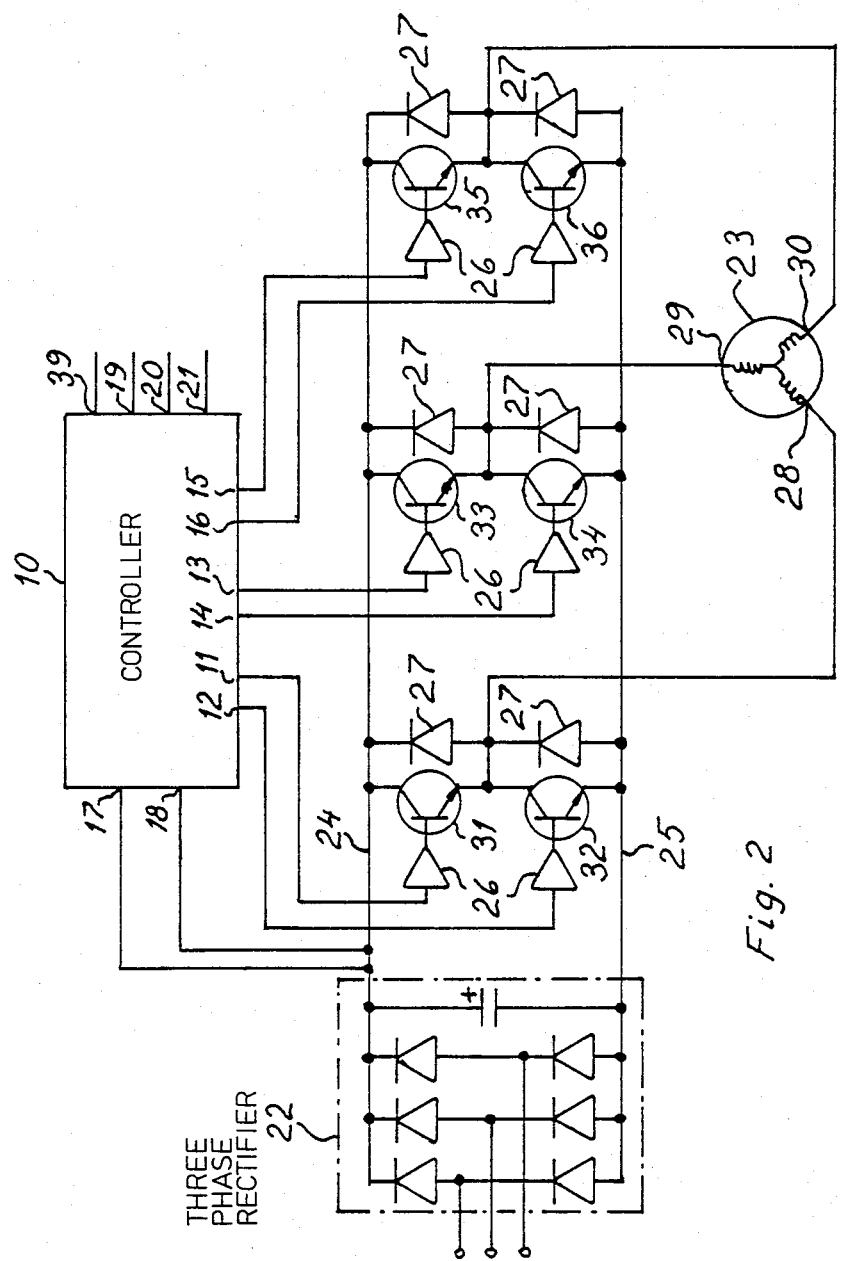
FIG. 2 shows the power circuits for the driving of the brushless alternating current motor.

The shown motor 23 is a three-phase brushless alternating current motor, e.g. an asynchronous motor. The motor is supplied with power from a converter 114 connected to a three-phase network. The converter comprises a three-phase rectifier, a direct current link, an inverter with six switching elements 31-36 and a controller 10 as shown in FIG. 2. The controller is provided with an input 19 for a continuously variable speed controlling signal and an input 20 for a start/stop signal. The shown compressor plant comprises pressure sensing means 109 which delivers a voltage being proportional to the pressure in pressure gas volume 106. This voltage, which is negative, is applied via resistor 120 to one of the inputs of operational amplifier 118. A reference voltage corresponding to the desired maximum pressure in volume 106 is set on potentiometer 116 and applied via resistor 117 to the input of amplifier 118. The closed loop amplification of amplifier 118 is set on the variable resistor 119 and corresponds to the desired difference between maximum pressure and minimum pressure in volume 106. If the inverting input of amplifier 118 is used the voltage supplied to input 19 will change from zero volt, corresponding to minimum motor speed, to a predetermined negative value, corresponding to maximum motor speed, when the pressure in volume 106 changes from maximum pressure to minimum pressure. The output voltage of amplifier 118 is also applied to a means for sensing a preset maximum pressure in form of a comparator 115. If the pressure in volume 106 exceeds the desired maximum pressure, the output voltage of amplifier 118 becomes positive so that the output voltage of comparator 115 changes from maximum positive voltage to maximum negative voltage or vice versa. This voltage is applied to input 20. Motor 23 is thus stopped. The motor is restarted when the output voltage of amplifier 118 becomes negative again.

Figure 3:
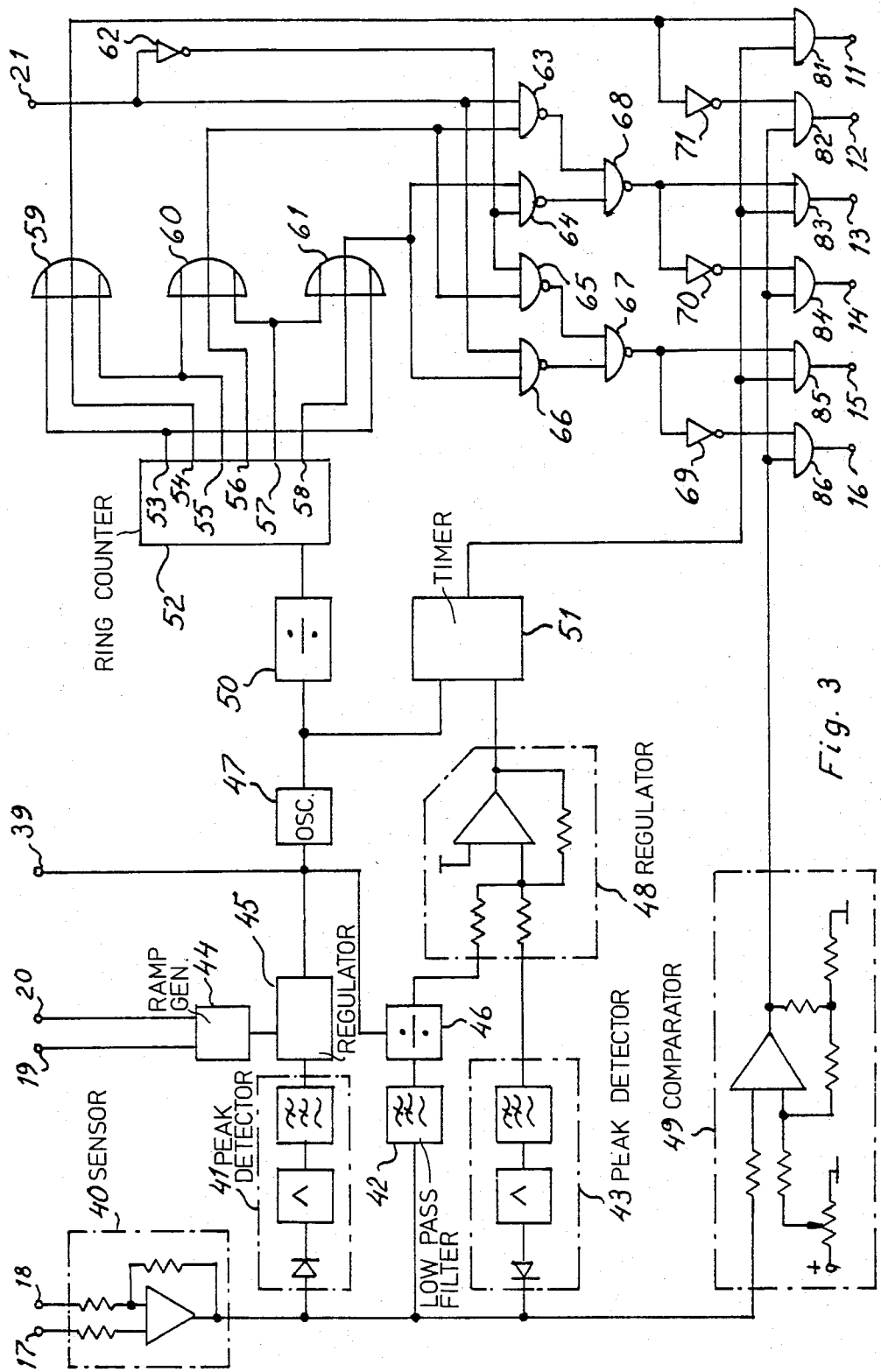
FIG. 3 shows the controller of FIG. 2.

The drive system shown in FIG. 2 comprises a three-phase rectifier 22 which is connected to a standard fixed frequency mains supply. The rectifier delivers direct current of substantially constant voltage to conduits 24, 25, which constitute a positive 24 and a negative 25 terminal of a direct current supply for an inverter. The inverter comprises six switching elements 31-36 for successively connecting motor terminals 28, 29, 30 on a brushless alternating current motor 23 to the positive terminal 24 and the negative terminal 25 of the direct current supply. The switching elements are in the drawing shown as transistors but could, of course, be combinations of thyristors or other elements. A diode 27 is placed in anti-parallel over each transistor to take care of reactive currents at the switching off of the transistor. To control the inverter, control signals are supplied from outputs 11-16 on a controller 10 as shown in FIG. 3. These control signals are supplied via amplifiers 26 to the base of respective transistor. Controller 10 is provided with inputs 17, 18 through which the direct current in conduit 24 is sensed. Controller 10 is further provided with an output 39 and inputs 19, 20, 21. Output 39 is only used if it during operation is desired to change the direction of rotation of the motor. The direction of rotation is selected by applying a logical signal to input 21. If rotation in only one direction is desired input 21 is connected either to a positive voltage or common. The speed of motor 23 may be changed by variation of a voltage applied to input 19. If, as for instance in a grinding machine, it is desired to drive the motor at a certain speed, input 19 is connected to a suitable voltage corresponding to the desired speed. Input 20 is intended for receiving a start/stop signal by which rotation or no rotation is chosen.

Controller 10, which is shown more in detail in FIG. 3, comprises a sensing means 40 for sensing the direct current in conduit 24. This current is presented as a voltage between inputs 17 and 18. The output signal of sensing means 40 is applied to a first peak detector 41, a low-pass filter 42, a second peak detector 43 and a comparator 49. Peak detectors 41 and 43 comprise diodes to react on positive and negative signals respectively. The peak detectors also comprise low-pass filters. First peak detector 41 preferably has a time constant of about $4/f$ where f is the maximum fundamental frequency of the current supplied to motor 23. The cut-off frequency, $-3$ dB, of peak detector 41 is preferably about $0.1\,f$. Lowpass filter 42 preferably has about the same cut-off frequency. Second peak detector 43 preferably has a time constant of about $1/f$ and a cut-off frequency of about $0.5\,f$.

Figure 4:
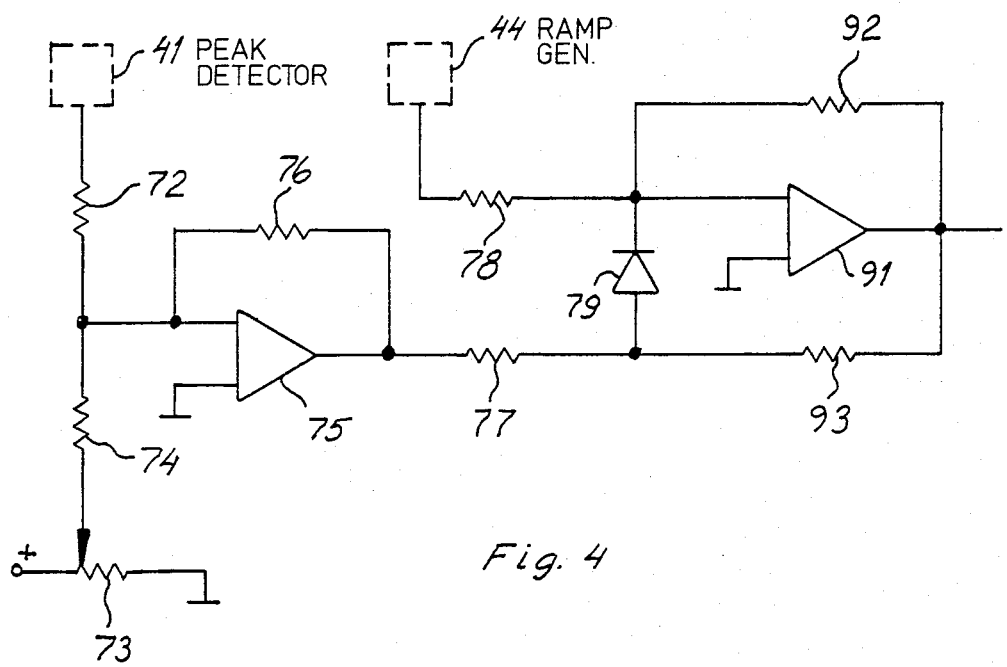
FIG. 4 shows a regulator of the FIG. 3 controller.

The peak value signal from peak detector 41 is supplied to a first regulator 45, which is shown more in detail in FIG. 4. Input signals from inputs 19 and 20 are supplied to a means 44 in form of a ramp generator. Ramp generator 44 comprises one or two operational amplifiers connected as integrators to supply regulator 45 with an increasing ramp voltage at motor start acceleration and a decreasing ramp voltage at motor stop deceleration. In this way it is possible to avoid that the normal speed maximum load current is exceeded when the motor is started or stopped. A change in the speed demand signal at input 19 is also integrated by ramp generator 44. Thus it takes some time before the output of ramp generator 44 becomes fully adapted to the input signals.

Figure 5:
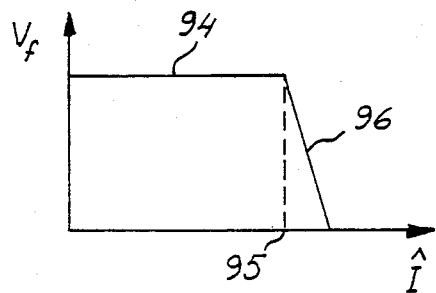
FIG. 5 shows a transfer function of the regulator of FIG. 4.

The peak value signal from first peak detector 41 is applied to one of the inputs of operational amplifier 75 via resistor 72. This signal is compared with a reference signal preset on variable resistor 73 and fed to the amplifier via resistor 74. The amplifier is provided with a feed-back resistor 76. The output signal of amplifier 75 is via a resistor 77 applied to diode 79. The output signal from ramp generator 44 is via resistor 78 supplied to one of the inputs of operational amplifier 91. Amplifier 91 is provided with a first feed-back resistor 92 and a second feed-back resistor 93 in series with diode 79. Resistor 93 has a much lower resistance than resistor 92. Preferably the ratio is about 1/20. If the output signal from amplifier 75, measured at diode 79, is more negative than the output signal from amplifier 91, measured at diode 79, is positive, diode 79 is reverse-biased. The closed loop amplification of amplifier 91 is then high. Regulator 45 then operates according to line 94 in FIG. 5, assuming constant signal from ramp generator 44. If the signal from first peak detector 41 increases, the output signal from amplifier 75 becomes less negative and at a certain signal level, level 95 in FIG. 5, which is preset on resistor 73, diode 79 becomes forward-biased. The closed loop amplification of amplifier 91 is now drastically reduced so that first regulator 45 delivers a frequency controlling signal according to line 96 in FIG. 5. This signal becomes zero at about 120% of the signal at level 95. The frequency controlling signal from the output of amplifier 91 is delivered to a voltage-controlled oscillator 47, output 39 and an analog divider 46, e.g. Analog Devices AD 534. The voltage-controlled oscillator produces an output signal whose frequency is proportional to the input voltage.

The rectified mean value signal obtained from low-pass filter 42 corresponds to the power supplied to motor 23 because the voltage of the direct current supply 24, 25 is substantially constant. This signal is supplied to divider 46 where it is divided with the frequency controlling signal, which is the demand signal for rotational speed of motor 23. The output signal of divider 46 will thus correspond to the torque demand from motor 23. This output signal, first voltage controlling signal, is supplied to a second regulator 48. The negative peak value signal, second voltage controlling signal, obtained from second peak detector 43 is also supplied to regulator 48 so that the output signal of regulator 48 becomes proportional to the difference between the first and the second voltage controlling signals. The negative peak value signal from peak detector 43 corresponds to the degree of magnetization of motor 23. This signal is obtained from negative pulses which are fed back to the direct current source when the transistors 31-36 are switched off. By controlling the level of these negative pulses it is possible to obtain a predetermined level of magnetization of the motor allowing both a high power to weight ratio and the avoiding of oversaturation, which would give unacceptable losses.

If the signal from sensing means 40 exceeds a predetermined level the output of comparator 49 becomes low. As a result outputs 12, 14 and 16 of AND gates 82, 84 and 86 respectively will be low. This means that the lower transistors 32, 34 and 36 of the inverter will be turned off so that the motor terminals 28, 29 and 30 will be cut off from the negative terminal 25 of the direct current supply. This cutting off thus functions as transient current protection for the inverter.

The output signal from voltage-controlled oscillator 47 is supplied to a timer 51, preferably an industrial timer of standard type 555, and to a divider 50. Divider 50 is preferably a programmable counter which delivers a pulse train having a frequency which is equal to the frequency of the input signal divided by a chosen constant. Timer 51 delivers a pulse train whose frequency is equal to the frequency of the output signal from voltage-controlled oscillator 47. The pulse width is controlled by the output signal from second regulator 48. This pulse train is supplied to AND gates 81, 83 and 85. The pulse train from divider 50 is supplied as clock signal to ring counter 52. In the ring counter a 1 and five 0's are stored. The 1 is shifted around by the pulse train from output 53 through 58 and back to 53. This makes one period of the fundamental frequency of the current supplied to motor 23. Outputs 53-58 of ring counter 52 are decoded by OR gates 59, 60 and 61. The output of each of these gates is high half the time and low half the time. A logic signal inverter 62 and NAND gates 63-68 are provided for selecting direction of rotation of motor 23. The output signals of gates 59, 60 and 61 are supplied to AND gates 81-86 for controlling the actuation of switching transistors 31-36 in the inverter. The inputs of gates 82, 84 and 86 are provided with logic signal inverters 71, 70 and 69 respectively.

Because the pulse width of the pulses leaving timer 51 remains constant independent of frequency if the signal from regulator 48 is constant, the mean value over half a period of the fundamental frequency of the voltage applied to any of the motor terminals will change simultaneously with the frequency as required by basic electromagnetic laws. Additional control of the mean value voltage is obtained by variation of the pulse width, which is controlled by regulator 48.

We claim:

1. A compressor drive system for controlling the gas pressure in a pressure gas volume connected to the compressor comprising:
    a compressor,
    a brushless alternating current motor for driving said compressor, and
    pressure sensing means connected to said gas volume for sensing the gas pressure therein,
    the improvement comprising said compressor being directly coupled to said motor for driving said compressor with the same speed as the motor,
    a converter means for supplying said motor with a drive voltage of variable amplitude and frequency,
    said pressure sensing means being connected to the converter to simultaneously change the amplitude and frequency of said drive voltage in a direction opposite to the direction of change of pressure of the pressure in said gas volume, and
    means for controlling the amplitude and frequency of said drive voltage so that the current at normal speed maximum load of the motor is never exceeded during motor start.

2. The compressor drive system as claimed in claim 1, having means for sensing a preset maximum value of said gas pressure and for decreasing the amplitude and frequency of said drive voltage to zero when said maximum value is exceeded, thereby stopping the motor.

3. The compressor drive system as claimed in claim 1 or 2 having a pressure gas container connected to said compressor and a relief valve connected to said gas container, said relief valve being controlled by the pressure at the compressor outlet so that said container is depressurized when said motor is stopped.

* * * * *